United States Patent [19]

Nishibori et al.

[11] Patent Number: 4,740,835
[45] Date of Patent: Apr. 26, 1988

[54] WIRE-TAP PREVENTING APPARATUS FOR COMMUNITY ANTENNA TELEVISION TERMINALS

[75] Inventors: Isao Nishibori; Kunihiko Nagasawa, both of Tokyo, Japan

[73] Assignee: Pioneer Electronic Corporation, Tokyo, Japan

[21] Appl. No.: 836,865

[22] Filed: Mar. 7, 1986

Related U.S. Application Data

[63] Continuation-in-part of Ser. No. 546,716, Oct. 28, 1983, abandoned.

[30] Foreign Application Priority Data

Oct. 30, 1982 [JP] Japan .................................. 57-191107

[51] Int. Cl.⁴ .......................... H04N 7/10; H04N 7/16
[52] U.S. Cl. ...................................... 358/86; 358/349; 455/2; 340/825.52
[58] Field of Search .................... 358/84, 86, 117, 122, 358/123, 349; 455/2, 4, 5; 340/825.31, 825.52; 371/50; 380/20

[56] References Cited

U.S. PATENT DOCUMENTS

| | | | |
|---|---|---|---|
| 3,943,305 | 3/1976 | Hagedorn | 340/825.52 X |
| 4,367,557 | 1/1983 | Stern et al. | 358/86 X |
| 4,390,898 | 6/1983 | Bond et al. | 358/123 X |
| 4,450,481 | 5/1984 | Dickinson et al. | 358/86 X |
| 4,464,747 | 8/1984 | Groudan et al. | 371/50 |
| 4,558,464 | 12/1985 | O'Brien, Jr. | 455/4 |
| 4,605,961 | 8/1986 | Fredicksen | 358/122 X |
| 4,677,685 | 6/1987 | Kurisu | 358/86 X |

FOREIGN PATENT DOCUMENTS

59-80079  5/1984  Japan .

Primary Examiner—Keith E. George
Attorney, Agent, or Firm—Sughrue, Mion, Zinn, Macpeak and Seas

[57] ABSTRACT

Uncompensated, illegal viewing of a restricted channel at a subscriber's terminal in a subscription CATV system is prevented by including a redundancy check-bit in each subscriber's terminal address, and by providing for a verification of the check-bit before viewing of the program on the channel is permitted.

2 Claims, 8 Drawing Sheets

ADDRESS DATA INPUT

|  | A<br>($P_{10}$) | B<br>($P_{11}$) | C<br>($P_{12}$) | D<br>($P_{13}$) | E<br>($P_{14}$) | F<br>($P_{15}$) | G<br>($P_{16}$) |
|---|---|---|---|---|---|---|---|
| P21 | 1A | 1B | 1C | 1D | 1E | 1F | $P_2$ |
| P22 | 2A | 2B | 2C | 2D | 2E | 2F | $P_3$ |
| P23 | 3A | 3B | 3C | 3D | 3E | 3F | $P_1$ |
| P24 | $P_G$ | $P_A$ | $P_B$ | $P_C$ | $P_D$ | $P_E$ | $P_F$ |

CONTENTS OF
ADDR. INPUT REG. 4c $P_A$ ---- VERTICAL PARITY BIT FOR 1A~3A $P_G$ ---- VERTICAL PARITY BIT FOR $P_2$, $P_3$ AND $P_3$ $P_{21}$ ---- HORIZONTAL PARITY BIT FOR 1A~1F $P_{23}$ ---- HORIZONTAL PARITY BIT FOR 3A~3B

"X" = 1 --- PARITY OK
"X" = 0 --- PARITY NG

CONTENTS OF CHECK BITS CHECKING SECTION 7

FIG. 9

|    |    |    |    |    |    | WIRE1 | WIRE2 |
|----|----|----|----|----|----|----|----|

| 1A | 1B | 1C | 1D | 1E | 1F | $P_2$ |
|----|----|----|----|----|----|----|
| 1  | 1  | 1  | 0  | 0  | 0  | 0  |
| 2A | 2B | 2C | 2D | 2E | 2F | $P_3$ |
| 0  | 0  | 0  | 1  | 1  | 1  | 0 |
| 3A | 3B | 3C | 3D | 3E | 3F | $P_1$ |
| 1  | 1  | 1  | 0  | 0  | 0  | 0  |
| $P_S$ | $P_A$ | $P_B$ | $P_C$ | $P_D$ | $P_E$ | $P_F$ |
| 1  | 1  | 1  | 1  | 0  | 0  | 0  |

THE NUMBER OF "1" 'S
IS 3 → OK

THE WIRES 1 AND 2 SHOWN
IN FIG. 7 ARE EXCHANGED

WIRE2 WIRE1

| 1 | 1 | 1 | 0 | 0 | 0 | 0 |
|---|---|---|---|---|---|---|
| 0 | 0 | 0 | 1 | 1 | 0 | 1 |
| 1 | 1 | 1 | 0 | 0 | 0 | 0 |
| 1 | 1 | 1 | 1 | 0 | 0 | 0 |

THE NUMBER OF "1" 'S
IS 4 → NG

WIRE-TAP PREVENTING APPARATUS FOR COMMUNITY ANTENNA TELEVISION TERMINALS

CROSS-REFERENCE TO RELATED APPLICATION

This application is a continuation-in-part of Application Ser. No. 546,716, filed Oct. 28, 1983 now abandoned.

BACKGROUND OF THE INVENTION

1. Field of the Invention

The present invention relates to a wire-tap preventing apparatus for community antenna television terminals in a chargeable or pay television system and the like.

2. Description of the Prior Art

In a chargeable television system to which are connected a plurality of subscribers' terminals, hereinafter referred to simply as OWAs, a viewing fee is set for each television channel, and, when a viewer wishes to view a program on a certain television channel, the viewer is charged the fee set for that television channel.

Data for permitting the viewing of the television channel is transmitted from a community antenna television center for comparison with the address of the OWA in the subscribing viewer's home, and if there is a favorable comparison, the subscriber is permitted to view the program on the channel. In a community antenna television system, hereinafter referred to simply as CATV, all of the subscriber addresses are made different in order to distinguish the subscribers from each other.

Referring to FIG. 1 there is shown a conventional OWA of the one-way type, in which the down polling data corresponds to the subscriber's terminal address and view-controlling data. The conventional OWA consists of an FSK receiver 1, a converter 2, a phase-locked loop unit 3, hereinafter referred to simply as PLL unit, a control unit 4, keys 5 for allowing a subscriber to select a desired television channel, and an address section 6. In the control unit 4, the output signal from the FSK receiver 1 is applied not only to the polling address data register 4a but also through a switch SW1 to RAM 4b which stores viewing-control data, and the address data inputted from the address portion 6 into the control unit 4 is applied to a comparator 4d through an address input register 4c in order to compare the address data with the data from the polling address register 4a; as a result, an output signal is produced by the comparator 4d to operate the switch SW1 to effect ON/OFF control thereof. When the subscriber, or viewer, selects one television channel by operating the keys 5 for the television-channel selection, the channel address is stored in a channel register 4e.

Referring to the operation of the controller 4f, the controller 4f provides access for loading the contents of the address section 6 into the address input register 4c, and also generates an output signal for controlling a switch SW2 on the basis of the contents (viewing-control data) stored in the RAM 4b and the contents stored in the channel register 4e, and, according to the ON/OFF state of the switch SW2, the path of the data from the PLL data memory 4g is controlled either to permit or to inhibit viewing. According to this CATV system, both the picture image of the program on a television channel and also the polling data are transmitted from the CATV center, and at the subscriber's terminal the picture and the polling data are received. Then, the polling data is compared with the subscriber's particular pre-assigned address data, which is different from the other subscriber's addresses within the CATV system. When the comparison produces a coincidence, the down data is fetched to use it for permitting or inhibiting the viewing of the television channel. This address data is inputted to the control unit 4 and serves as a reference for detecting coincidence therewith of the polling data. The switch SW1 in FIG. 1 is turned OFF when the polling address data is not coincident with the terminal's set address data, and is turned ON upon coincidence thereof. Further, the switch SW2 is turned ON when the RAM 4b (containing viewing-control data corresponding to the channel register) is in a viewing-permitting mode, and is turned OFF in the viewing-inhibiting mode. When the switch SW2 is ON, the data from the PLL data memory 4g is stored in the PLL unit 3 to display the picture image of the selected television channel on the television set in the subscriber's home.

The address section 6 of the terminal is composed of, for example, a jumper and a DIP switch which are easily discernible from the outside of the terminal unit, so that it is easy for an unauthorized person to change or modify the address from the pre-assigned set address to another address by changing, for example, the setting of the DIP switch. On the other hand, the control unit 4 cannot detect such changing of the address, and further the OWA system has no up-data; therefore, the CATV center cannot detect such unauthorized changing of the address occurring in the subscriber's terminal, which means that a subscriber can purloin viewing of television programs merely by changing the address, thereby making impossible the proper management of the CATV system.

SUMMARY OF THE INVENTION

The object of the present invention is to provide a wiretap-preventing apparatus for community antenna television subscriber terminals, in which the control unit, per se, of a terminal detects unauthorized modification of the address section, even by the changing of the wiring of the address section, thereby preventing the CATV system from being tapped illegally.

The novel features of the present invention reside in a wiretap-preventing apparatus for community antenna television terminals wherein parity or redundancy check bits are added into the address of each community antenna television terminal, and wherein there is provided an address data check-bit checking section in the address reader section of the address of community antenna television terminals, and wherein the viewing of certain television channels is controlled by an output signal representing OK or NG.

BRIEF DESCRIPTION OF THE DRAWINGS

FIG. 9 shows tables illustrating how unauthorized changing of the wiring is detected.

DETAILED DESCRIPTION OF THE PREFERRED EMBODIMENT

Figure 1:
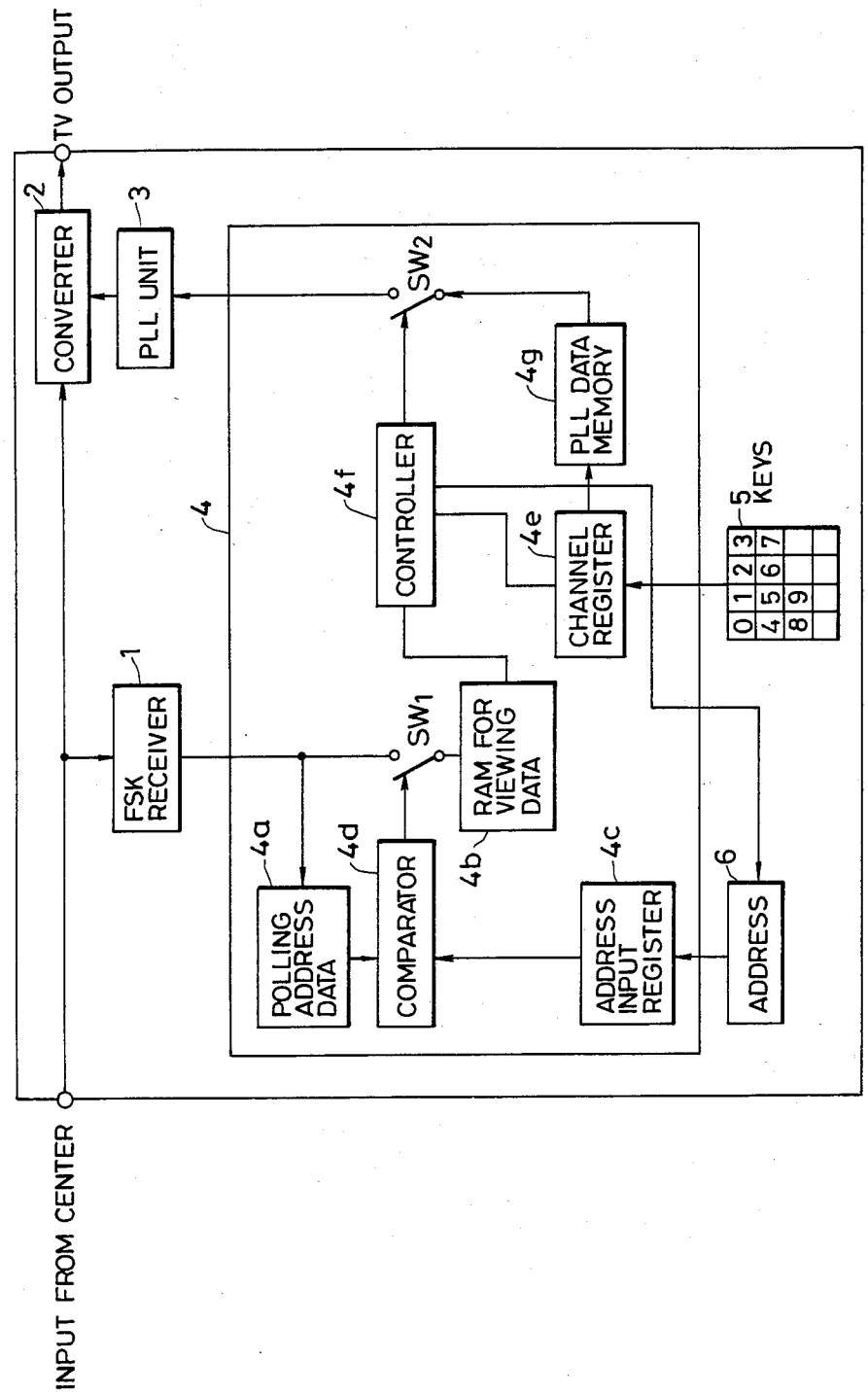
FIG. 1 is a block diagram of a conventional terminal portion.
Figure 2:
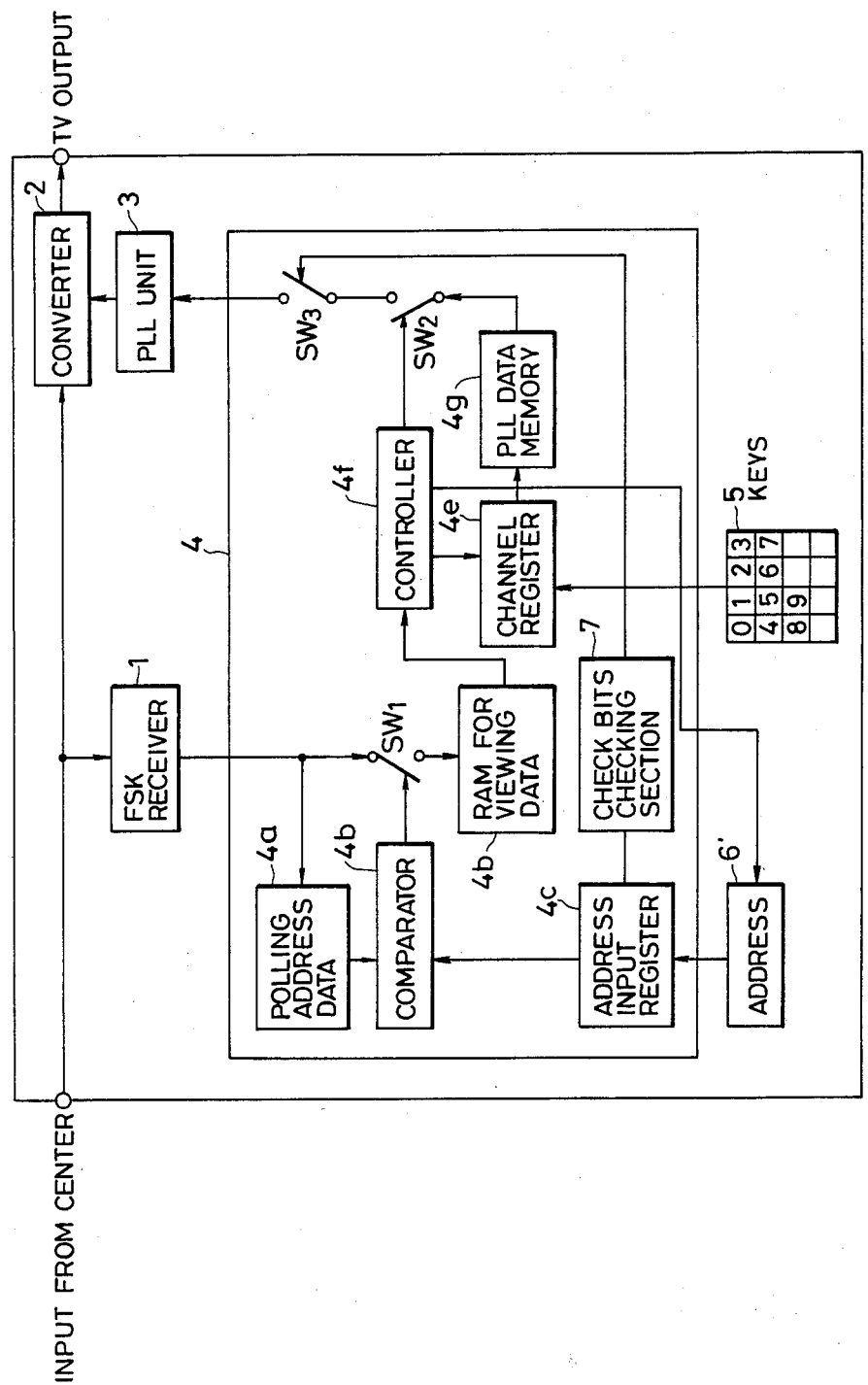
FIG. 2 is a block diagram of an embodiment of the present invention.

Referring now to FIG. 2 an embodiment of the present invention is shown. Components corresponding to those in FIG. 1 are shown by the same reference numerals used in FIG. 1, and their descriptions are omitted here. Check-bits are added to the address of the address section 6' as redundancy bits by, for example, cutting or connecting jumpers corresponding to particular bits. In FIG. 2, numeral 7 designates a check-bit checking section disposed within the control unit 4 for controlling a switch SW3 disposed in the data path between the PLL data memory 4g and the PLL unit 3.

Figures 3, 4:
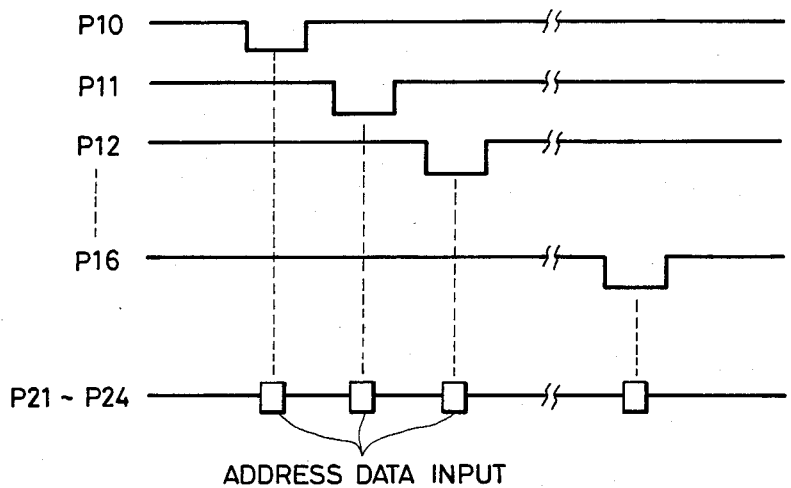
FIG. 3 is a timing diagram used for explaining the operation of the apparatus of FIG. 2.
FIG. 4 shows the arrangement of data in a memory used in the apparatus of FIG. 2.
Figure 5:
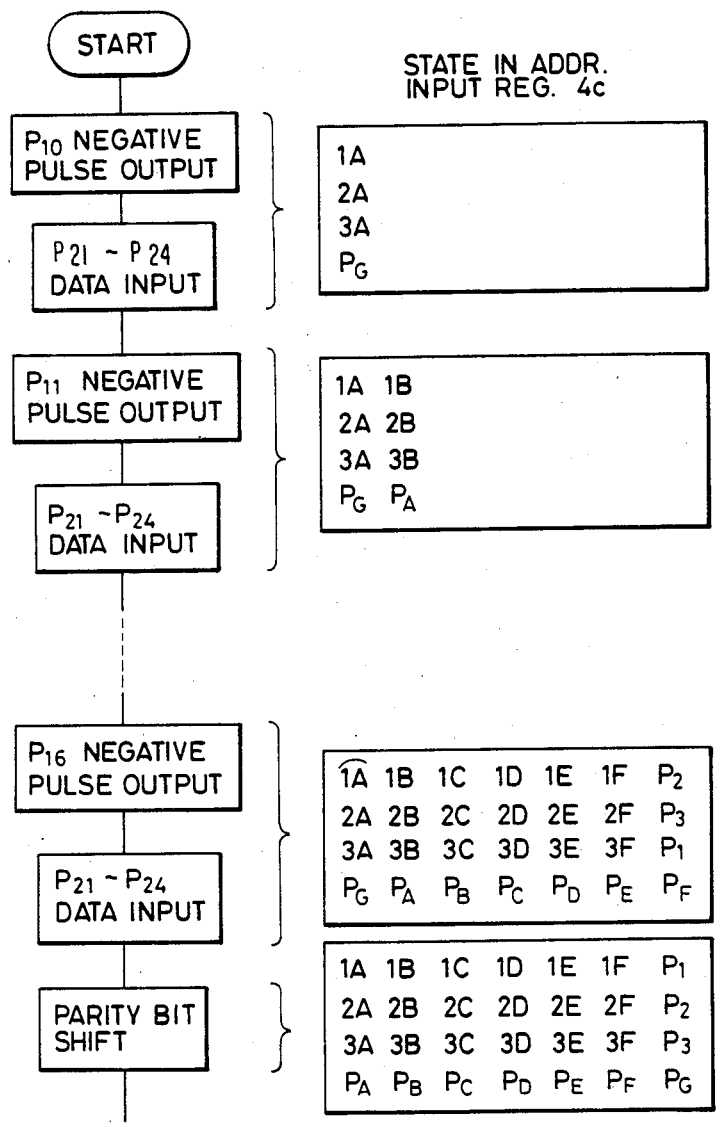
FIG. 5 is a flow chart showing the loading of data into the memory used in the apparatus of FIG. 2.

As explained with reference to FIG. 1, the controller 4f controls the switch SW2 on the basis of the contents of the RAM 4b (viewing-control data) and the contents of the channel register 4e, thereby controlling the data path from the PLL data memory 4g, the result being to permit or to inhibit viewing the program on a television channel. Similarly, the program and the polling data are transmitted from the CATV center, and when they are received by the terminal, the received polling data is compared in the comparator 4d with the set terminal address. If coincidence is found by the comparison, the following down-data is continuously fetched to utilize it to control the permission or inhibition of viewing of the channel program. In this case, the address section 6' generates the address signal including the additional check-bits, and the address signal with the check-bits is checked by the check-bit checking section 7. One method of checking the address signal is depicted in FIG. 4. As shown in FIG. 4, the address bits (1A–1F, 2A–2F and 3A–3F) and check bits ($P_A$–$P_G$ and $P_1$–$P_3$) are stored in a memory in the check-bit checking section 7 from the address section 6'. After the check bits are shifted to new positions, a set of address bits is compared with the corresponding check bits row by row and column by column. If the address signal, including the check-bits, is not changed, the switch SW3 is controlled by an "OK" signal from the check-bit checking signal 7 to turn ON (closed).

However, if the address section 6' has been modified or changed, the check-bit checking section 7 produces an "NG" (Not Good) signal, and the switch SW3 is controlled to turn OFF (opened). Thus, the view-inhibiting mode is established, the PLL unit 3 does not operate, and the picture image on the screen of the television set is inhibited, thereby making it impossible to view the picture image.

FIGS. 3 through 6 relate to the requisite data comparing operation. Since such an operation is well known per se, only a brief summary will here by given. Addresses in a sequence as shown in FIG. 3 are applied to the address register 4c by the address section 6' to which the negative pulse outputs ($P_{10}, \ldots, P_{16}$) are applied by controller 4f, which operation is shown by the flow chart of FIG. 5. When all bits have been loaded, the check bits ($P_A$, $P_B$, etc.) are rearranged as indicated in the last stage of the flow chart of FIG. 5.

Figure 6:
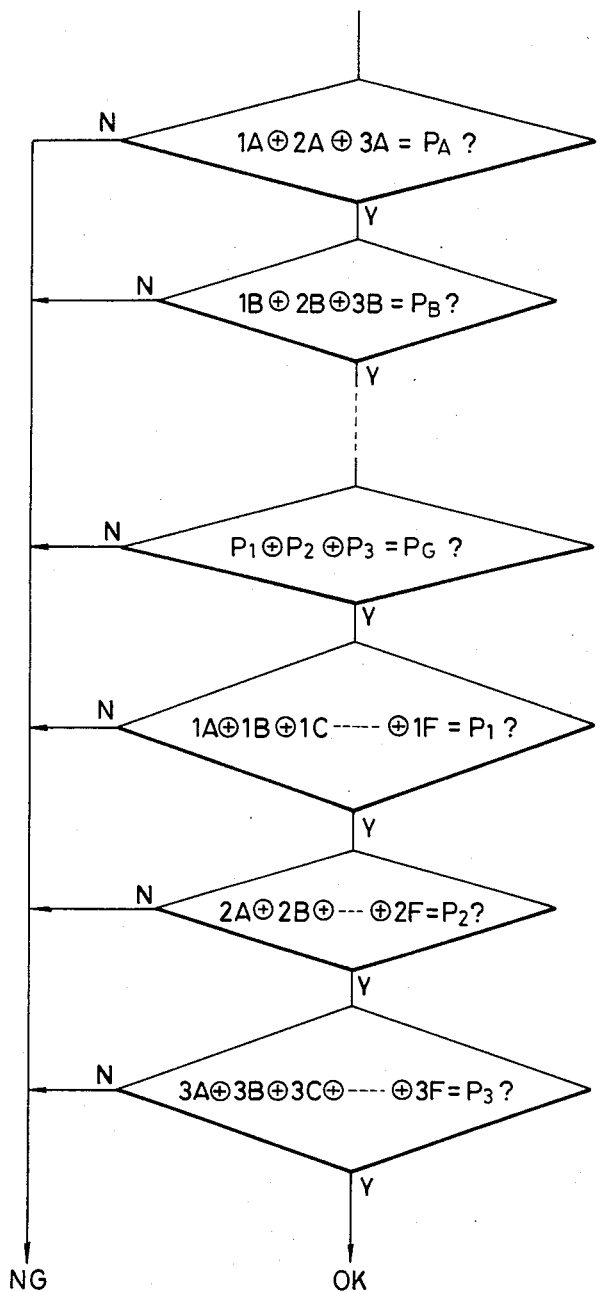
FIG. 6 is a flow chart showing a comparison operation performed by the apparatus of FIG. 2.

The actual comparison operation is then carried out using sequential exclusive-or logic operations as indicated by the chart of FIG. 6.

Figure 7:
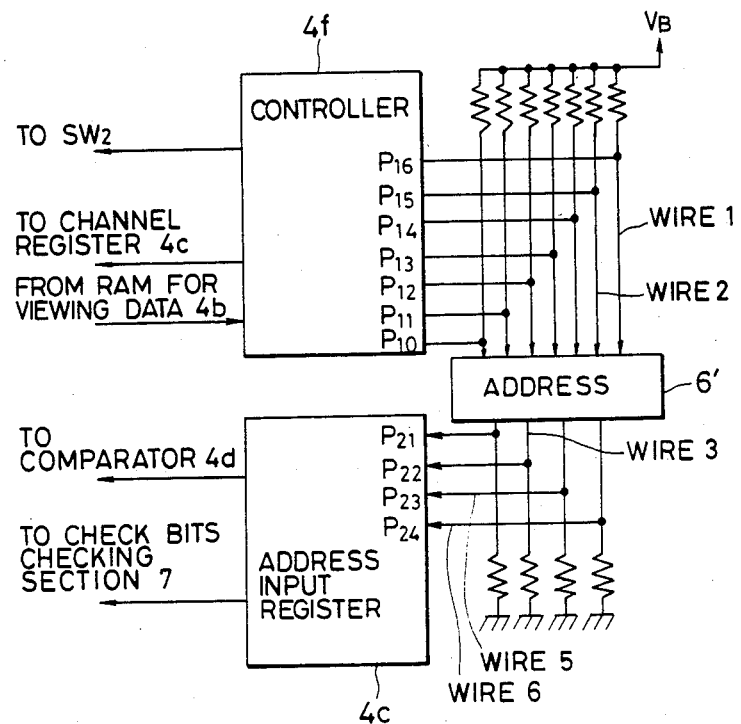
FIG. 7 is a schematic diagram illustrating the manner in which parity or redundancy check-bits are generated.

The method of generating the check-bits in the address section 6' is shown in FIG. 7, wherein negative pulses are outputted from the output terminals of controller 4f at the timing shown in FIG. 3. The address data are outputted from the address section 6' at the negative pulse timing, and are inputted into the address input register 4c. The number of the output terminals of the controller 4f is seven, and the number of the input terminals $P_{21}$–$P_{24}$ of the address input register 4c is four, so that the address data and the parity data are divided into 4 bits×7, and are outputted from the address section 6'. The contents of the address input register 4c are shown in FIG. 4. The address input register 4c includes seven registers of 4 bits. By this construction, the 4 bits×7 output data can be stored in the address input register 4c. In 28 bits stored in the address input register 4c, the data being outputted into $P_{24}$ (FIG. 4) of the address input register 4c are parity bits ($P_A$–$P_G$). Four bits data ($P_1$–$P_3$, $P_F$), being outputted from the address section 6' to the address input register 4c by the negative pulse from $P_{16}$ of the controller 4f, are also parity bits.

A PROM is used as the address section 6' in order to reduce its vulnerability to tampering as compared to the address section 6 of FIG. 1. The output of the controller 4f is routed to the input of the address section 6' (PROM) in order to fetch the address data and the check data bits stored in the PROM. FIG. 3 shows the timing for the input and output of the signals. The signal from the controller triggers the PROM to output the address data and the check data bits to the address input register 4c in accordance with the timing shown in FIG. 3. A PROM has the characteristic that, after data is set in the PROM, it is possible to read out the data, but it not possible to reset the data. However, a person who tries to tap a pay channel program may change his address to another address. In order to change the address, he may exchange wires 1 and 2, or wires 5 and 6 of FIG. 7, or may cut the wire 3. However, the change can be detected by the parity data check according to the present invention, wherein the positions of the parity bits are shifted by one column and one row as shown in FIG. 4. This allows the detection of the exchange of the wires 1 and 2 or wires 5 and 6.

FIG. 9 illustrates the case in which the address and the check bits may be simultaneously exchanged by exchanging wires 1 and 2 of FIG. 7. In example 1, of FIG. 9, the address is

---
1A ... 1F 2A ... 2F 3A ... 3F
(MSB) 111000 000111 111000 (LSB)
---

If the wires 1 and 2 are exchanged with each other for the purpose of wiretapping, the check bits $P_1$, $P_2$, $P_3$ and $P_F$ are exchanged with the address bits 1F, 2F, 3F and parity bit $P_E$ as shown in Example 2. The parity check bit section 7 checks the number of the data "1"s. In example 2, the abnormal state is detected by the parity check. If the parity check is not performed, the address can be changed to another address, such as

---
1A ... 1F 2A ... 2F 3A ... 3F
(MSB) 111000 000111 111000 (LSB)
---

Figure 8:
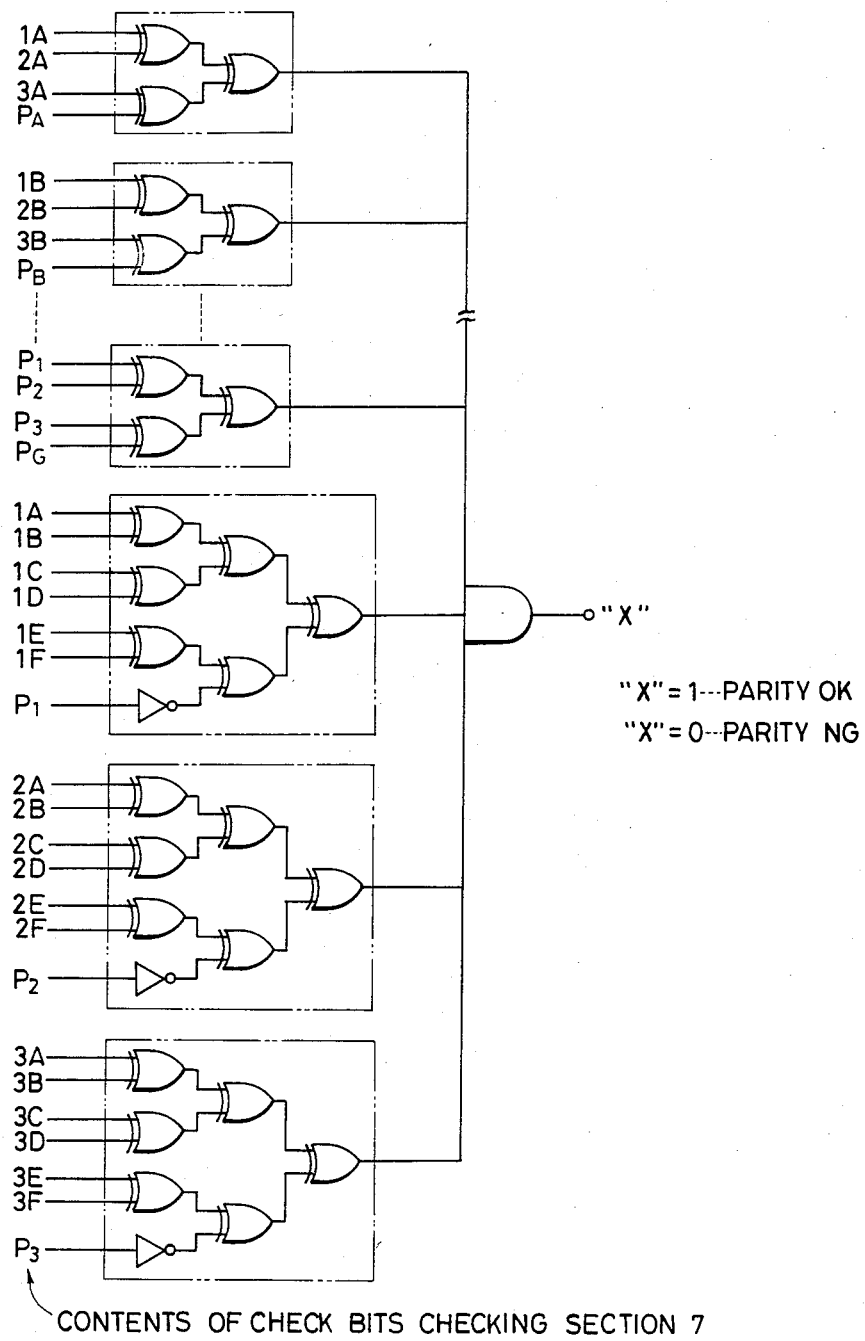
FIG. 8 is a schematic diagram of a circuit corresponding to the flow chart of FIG. 6.

FIG. 8 shows the structure of a bit-checking section 7 corresponding to the functions illustrated in the flow chart of FIG. 6 and containing Exclusive OR, Inverter and AND circuits. The manner in which the address and check-bits are compared row-by-row is apparent from FIG. 8. The circuit shown in FIG. 8 detects whether the number of data "1"s in column and row is odd. More specifically, the circuit of FIG. 8 checks the parity of the contents of the address input register 4c. When parity is OK for a block, the output "x" is "1". When parity is NG, the output is "0". Thus, only when the parity is OK for all blocks does the output "x" from the AND circuit in FIG. 8 becomes "1".

As shown in FIG. 4, the check-bit $P_A$ is shifted by one column from the address bits. This allows the prevention of illegal viewing as described above. However, when the check-bits are compared, the comparison is more easily performed in the aligned form. If the check-bits are not shifted, it is necessary to shift $P_A$-$P_F$ and $P_1$-$P_3$ for each comparison step in order to perform the comparison (see the flow chart in FIG. 6). If the check-bits are shifted to the new positions, it is not necessary to shift the parity bits for each comparison step. Accordingly, the comparison is easily performed.

The above-mentioned embodiment of the present invention has been explained with respect to an OWA system; however, the present invention is not limited to this embodiment but may be applied to a security system, a two-way CATV system and the like.

As mentioned above, according to the present invention redundancy bits added to the terminal address data are checked by a check-bit checking section so that a viewer cannot make undetected modifications of the address data, thereby maintaining proper management of the CATV system by preventing illegal viewing of the program.

We claim:

1. A method of prohibiting unauthorized viewing of a restricted channel at a subscriber's terminal in a CATV system including a plurality of subscribers' terminals, wherein each of the subscribers' terminals has different preassigned terminal address data stored therein which is compared with polling address data from a CATV center to authorize viewing of the channel, the method comprising the steps of:

generating from said stored data an address signal including address bits of address data and additional redundancy check-bits of check data;

storing said address bits and said check-bits in positions defined by a matrix of columns and rows;

comparing a set of said address bits with the corresponding check-bits row-by-row and column by column; and permitting viewing of the restricted channel only when the comparison indicates that said address data in said address signal corresponds to said preassigned terminal address data and said polling address data is coincident with said preassigned terminal address data.

2. The method as claimed in claim 1, further comprising the step of shifting said check-bits to new positions before the comparing step.

* * * * *